April 13, 1954     E. R. WILLIAMS     2,675,126
APPARATUS FOR SEPARATING OIL FROM WATER
Filed June 15, 1950     2 Sheets-Sheet 1

Elmer R. Williams
INVENTOR.

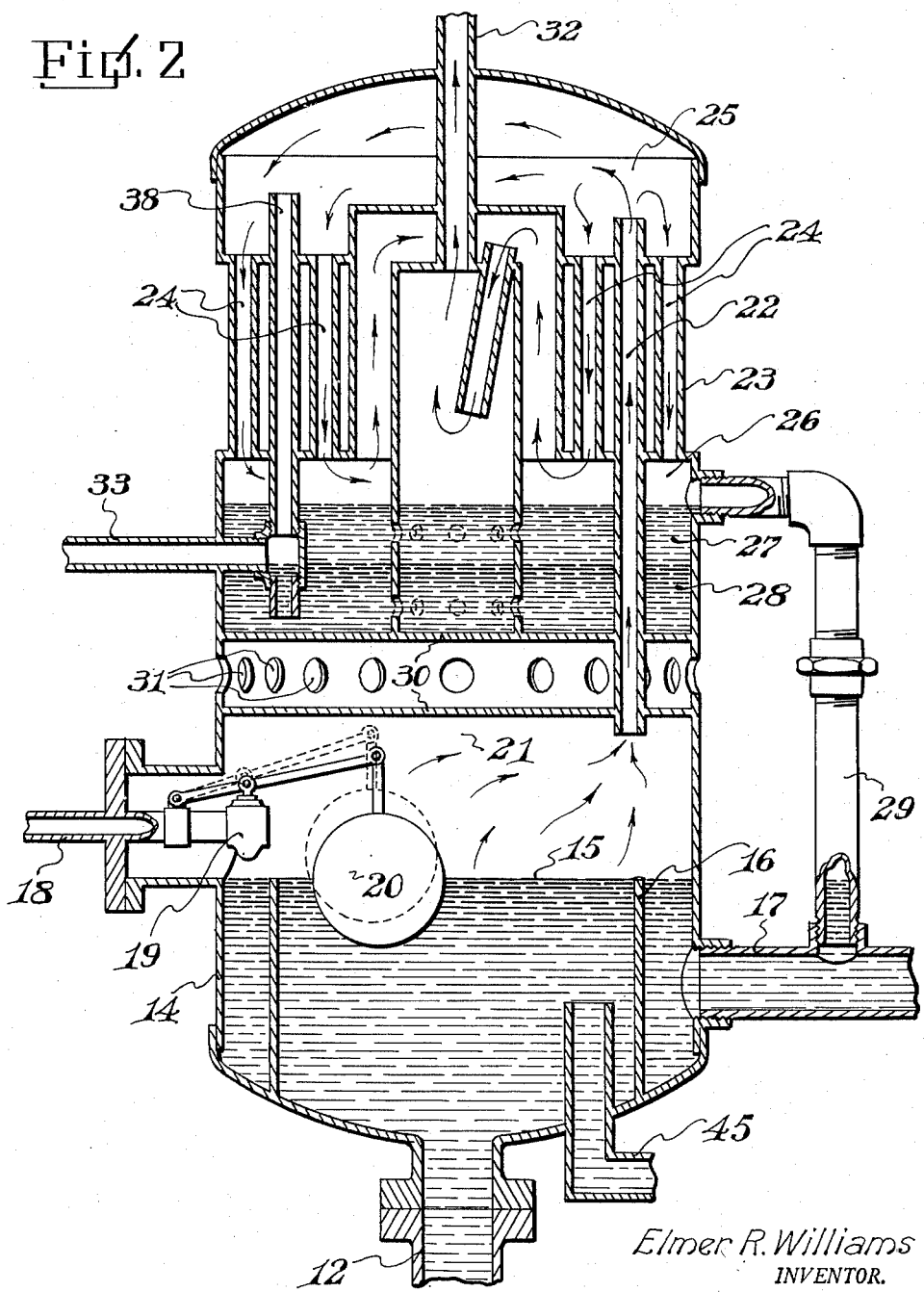

Patented Apr. 13, 1954

2,675,126

UNITED STATES PATENT OFFICE 2,675,126

APPARATUS FOR SEPARATING OIL FROM WATER

Elmer R. Williams, Tulsa, Okla.

Application June 15, 1950, Serial No. 168,258

8 Claims. (Cl. 210—52)

The invention relates to apparatus for removing free water from oil without having to heat all the oil and all of the water.

A further object is to provide a water and oil separating apparatus wherein the inflowing oil, with water therein, is subjected to a heating operation and a water settling operation, the oil and water heated for removing the globules which remain in suspension in the oil so the water can gravitate to a settling tank, the oil passing upwardly from the heating stage to an overflow tank where it is subjected to a gas action for agitating purposes, and for separating steam and gas vapors therefrom, and finally transferring the steam and gas vapors through a heat exchanger for cooling and knocking out further water and oil in said steam and gas vapors, and then discharging the residue from the device.

A further object is to provide means whereby a constant liquid level is maintained, as far as water is concerned, in the system, and to control said water level through a pressure controlled dump valve.

A further object is to provide an oil and water separating device wherein there is a combined heating, settling, without heating, and final separation through a cooling operation.

A further object is to provide an oil and water separator apparatus wherein the water level is maintained constant for settling purposes and balanced against gas pressure and hydrostatic pressure of the oil and water.

A further object is to position the cooling exchanger where it will not be subjected to the heating operation thereby increasing the condensation operation.

With the above and other objects in view the invention resides in the combination and arrangement of parts as hereinafter set forth, shown in the drawings, described and claimed, it being understood that the changes in the precise embodiment of the invention may be made within the scope of what is claimed without departing from the spirit of the invention.

In the drawings:

Figure 2 is an enlarged vertical longitudinal section through the heat exchanger and oil overflow discharge.

Figure 1:
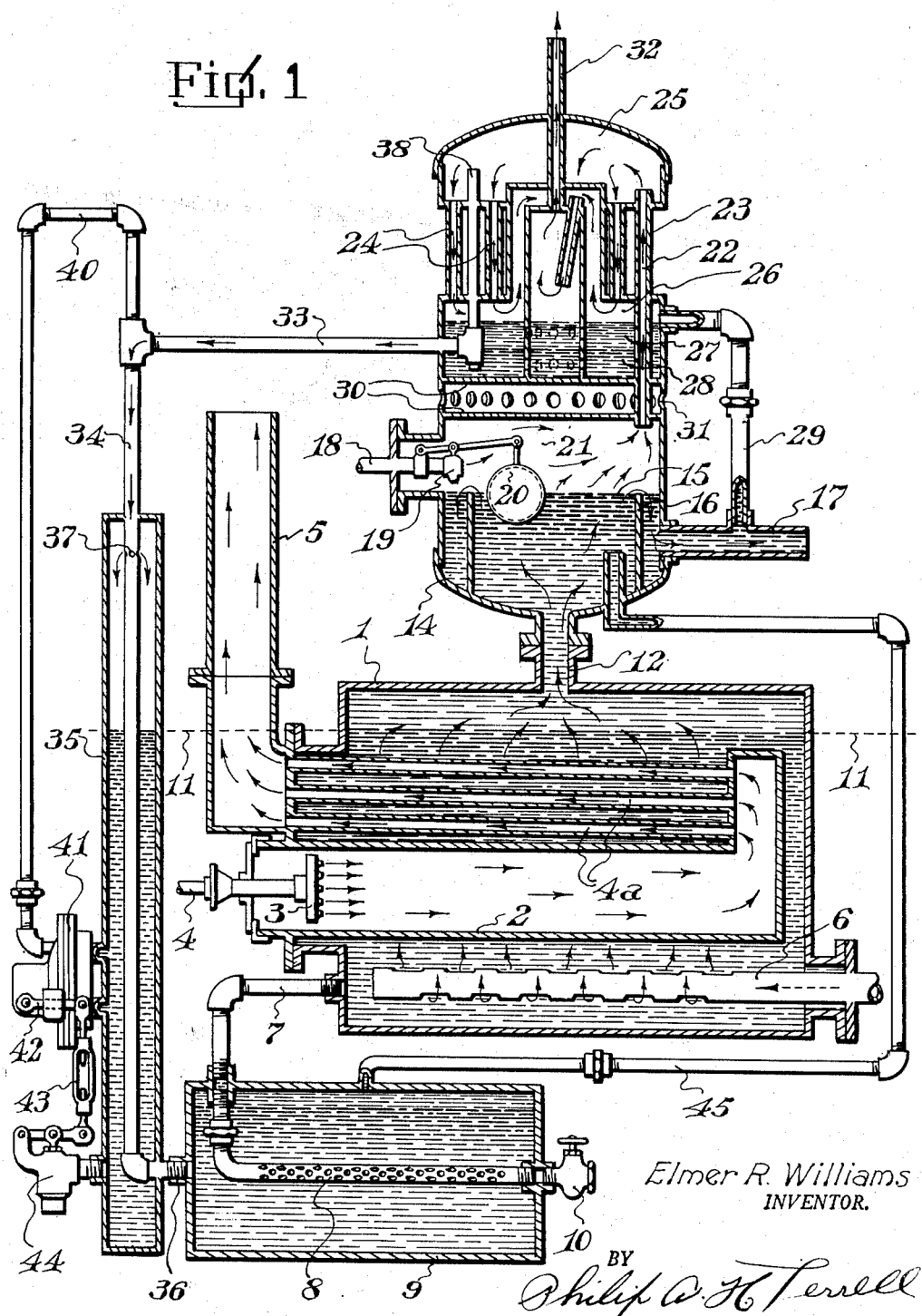
Figure 1 is a vertical longitudinal sectional view through the apparatus.

Referring to the drawings, the numeral 1 designates the heater casing and disposed within said heater casing is a fire box 2, into which box extends a gas burner 3 supplied with gas from a gas line 4. The products of combustion move in the direction of the arrows, Figure 1, and through the horizontal tubes 4a, and are finally discharged through a stack 5. Extending into the casing 1, below the fire box 2, is a perforated water and oil supply pipe 6 getting its supply from any source. It will be noted that some of the water will separate from the oil by gravity before the heating operation, and this water will flow through the pipe 7 downwardly and will be discharged through the perforated pipe 8 into the settling tank 9.

Pipe 8 is preferably provided with a control valve 10 for drainage purposes when desired.

The oil and water which does not separate incident to settling is then subjected to the action of the heat, carried upwardly and subjected to the heating operation for knocking out the water and allowing the water to gravitate to the settling tank. During the operation, a constant liquid level is maintained at 11, as far as the water is concerned, and the separated oil passes upwardly through the pipe 12 into the bottom or lower end of the tank 14. In the tank 14 a constant oil level 15 is maintained and the oil overflows over the upper edge of annular partition 16 and discharged to any suitable point to an oil outlet pipe 17.

Extending into the tank 14 is a gas supply pipe 18, which pipe is provided with a gas supply valve 19. The supply valve 19 is controlled by a float 20, which float is moved upwardly and downwardly by the fluctuation of the liquid level 15 of the oil. The gas pressure intake maintains a substantial liquid level and mixes gas with steam rising from the heated oil in the chamber 21. The steam and gas then pass upwardly through a gas passage 22 in one side of the heat exchanger 23 where the gas and steam makes a circuitous movement through vertical tubes 24 from the upper chamber 25 of the heat exchanger into a separating chamber 26 forming the lower part of the heat exchanger. During this operation, oil or gasoline 27 is separated from additional water 28 and the gasoline overflows through a pipe 29 into the oil line 17. It will be noted that the heat exchanger 23 is separated from the tank 14 by spaced walls 30 so there can be a free circulation of air through the apertures 31 thereby preventing the heat transfer from the tank 14 to the exchanger. The exchange operation is purely a cooling one, hence it will be seen that the knock out operation is first a gravity one, second, a heating one, and finally a separation by cooling. After the cooling and condensation operation, the remaining gases are discharged to the atmosphere or to any suitable place through a discharge pipe 32, however this gas can be used for heating purposes, and may be utilized for supplying gas to the burner 3.

Extending into the exchanger is a water overflow pipe 33 which leads to and discharges into a vertically disposed pipe 34, which pipe 34 extends downwardly into the chamber of a water leg 35 and thence from the lower end of the water leg and is connected at 36 to the settling tank 9. Pipe 34 is provided with perforations 37 so that water will discharge into the upper end of the water leg, and the water in the water leg is maintained at the water level 11. To break any siphoning action through pipe 33, pipe 33 is provided with a pipe 38 extending upwardly and terminates in the chamber 25.

The upper end of pipe 34 has connected thereto an upwardly and downwardly extending equalizing pipe 40 having its lower end connected to one side of a diaphragm valve 41. The other side of said diaphragm valve is in communication with the water column in the water leg for equalizing purposes. As the pressure is the same on both sides of the diaphragm 41, if the water level rises the diaphragm will rock a lever 42 upwardly, imparting a pull on the connection 43, controlling a water dump valve 44, therefore it will be seen that a constant liquid level is maintained at all times. The upper side of the settling tank 9 is provided with an oil discharge pipe 45 through which any oil, which may collect on the water in the settling tank, will be forced upwardly by the hydrostatic pressure and discharged into the oil body in the tank 14 through the pipe 45 where it will be treated by the gas vapors and gas pressure for the final separating operation.

From the above it will be seen that a water and oil separating apparatus is provided wherein the oil and water is first subjected to a settling operation and the remaining oil and water subjected to a heating operation; next, conveyed to a discharge point in the tank 14 where it is subjected to gas pressure purposes, such as agitation, and the pressure used for balancing the system, and finally further treated to a cooling operation for separating the water and oil from the steam and gas vapors. It is obvious that the steam will condense in the exchanger and the excess gas will be discharged from the apparatus.

The invention having been set forth what is claimed as new and useful is:

1. An apparatus for separating oil from water, said apparatus comprising a settling tank, an oil receiving tank above the settling tank for the oil and water to be treated, an oil supply pipe connected to said oil receiving tank, a pipe connection between the oil receiving tank and the settling tank, through which settling tank free water in the oil will flow to the settling tank, a heating element in the oil receiving tank for separating the oil from the water so the oil will flow upwardly, a second oil receiving tank above the first mentioned oil receiving tank, and into which second oil receiving tank the oil from the water and oil in the first oil receiving tank is discharged, a discharge pipe carried by the second oil receiving tank for discharging separated oil from the oil in the second oil receiving tank, overflow means in the second oil receiving tank for maintaining a constant oil level therein and a gas and vapor space above the oil level therein, float control means for admitting gas, under pressure in the gas and vapor space above the oil in the second oil receiving tank, an exchanger cooler above the second oil receiving tank, the upper end of said exchanger cooler having an exchanger chamber, a passage of communication between the exchanger chamber and the gas and vapor space in the second oil receiving tank, said exchanger forming means for separating additional water and oil from the gas and vapor and discharging the gas from the exchanger, a pipe connecting the exchanger and the discharge pipe from the second oil receiving tank and through which oil from the exchanger passes to the last named discharge pipe, means for discharging the water from the exchanger and means for maintaining a constant water level in the first mentioned oil receiving tank.

2. A device as set forth in claim 1 wherein the second oil receiving tank and the exchanger above the same are connected together by an intermediate chambered portion forming an insulating air space between the second oil receiving tank and the exchanger.

3. A device as set forth in claim 1 including an overflow partition in the second oil receiving tank and having its upper edge above the discharge pipe from the second oil receiving tank.

4. A device as set forth in claim 1 including an oil discharge pipe connecting the upper side of the settling tank and discharging into the second oil receiving tank to the inside of the overflow means.

5. A device as set forth in claim 1 wherein the means for discharging water from the exchanger cooler comprises an apertured pipe discharging into the settling tank, a water leg surrounding said pipe and apertured portion thereof and in which a predetermined water level is maintained, the apertured portion of said pipe being disposed in the upper end of the chamber of the leg, a water dump valve connected to the lower end of the leg and hydrostatic pressure controlled means cooperating with the dump valve for opening said valve upon the rising of the water level and closing said valve when the water level in the leg and in the first and second oil and water receiving tanks reach their predetermined levels.

6. A device as set forth in claim 1 including means for automatically maintaining a water level in the first mentioned oil and water receiving tank at a position above the heating element therein.

7. A device as set forth in claim 1 wherein the means for discharging water from the exchanger comprises a pipe leading to the settling tank and having its intake end in the lower end of the exchanger, said pipe also having a siphon preventing extension extending into the upper end of the chamber of the exchanger where it will be exposed to gas.

8. A device as set forth in claim 1 wherein the liquid level maintaining means for the exchanger comprises a pipe leading from the lower end of the exchanger and through which water passes, said pipe being connected to the settling tank, a water leg through the chambers of which said pipe extends, means for discharging water from said pipe into the upper end of the chamber of the leg, a level regulator valve carried by the water leg and hydrostatically adjusted for a predetermined level, a gas bypass pipe from the last mentioned pipe to the outer side of the regulator, a gas supply pipe connected to the pipe within the exchanger, a dump valve carried by the lower end of the water leg and an operating connection between the dump valve and regulator for opening and closing the dump valve upon fluctuation of the water level within the water leg.

References Cited in the file of this patent
UNITED STATES PATENTS

| Number | Name | Date |
|---|---|---|
| 2,167,160 | Raymond | July 25, 1939 |
| 2,232,948 | Ihrig et al. | Feb. 25, 1941 |
| 2,366,899 | Hall et al. | Jan. 9, 1945 |
| 2,484,205 | Candler | Oct. 11, 1949 |
| 2,562,653 | Williams | July 31, 1951 |